(12) United States Patent
He et al.

(10) Patent No.: US 12,022,524 B2
(45) Date of Patent: Jun. 25, 2024

(54) RANDOM ACCESS CHANNEL REPETITION

(71) Applicant: QUALCOMM Incorporated, San Diego, CA (US)

(72) Inventors: Linhai He, San Diego, CA (US); Hung Dinh Ly, San Diego, CA (US); Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 17/444,523

(22) Filed: Aug. 5, 2021

(65) Prior Publication Data

US 2023/0037834 A1 Feb. 9, 2023

(51) Int. Cl.
*H04W 74/0833* (2024.01)
*H04L 1/08* (2006.01)

(52) U.S. Cl.
CPC .......... *H04W 74/0833* (2013.01); *H04L 1/08* (2013.01)

(58) Field of Classification Search
None
See application file for complete search history.

(56) References Cited

U.S. PATENT DOCUMENTS

| | | | | |
|---|---|---|---|---|
| 10,271,355 B2 * | 4/2019 | Liu | ....................... | H04W 28/18 |
| 2013/0258938 A1 * | 10/2013 | Sagfors | ................ | H04W 72/02 370/312 |
| 2016/0295503 A1 * | 10/2016 | Bucknell | ............... | H04W 76/18 |
| 2016/0330766 A1 * | 11/2016 | Liu | .................... | H04W 74/0833 |
| 2017/0303239 A1 * | 10/2017 | Sågfors | ................. | H04W 72/02 |
| 2018/0152970 A1 * | 5/2018 | Lee | ....................... | H04B 7/0619 |
| 2020/0196226 A1 * | 6/2020 | Bucknell | ........... | H04W 74/0833 |
| 2020/0221504 A1 * | 7/2020 | Cirik | ..................... | H04L 1/1822 |
| 2021/0084689 A1 * | 3/2021 | Ly | ......................... | H04L 5/0044 |
| 2021/0144743 A1 * | 5/2021 | Rastegardoost | ...... | H04W 72/23 |
| 2023/0037834 A1 * | 2/2023 | He | ........................... | H04L 1/08 |

FOREIGN PATENT DOCUMENTS

| | | | |
|---|---|---|---|
| WO | 2021030804 A1 | 2/2021 | |
| WO | WO-2021030804 A1 * | 2/2021 | ........... H04L 1/1671 |

OTHER PUBLICATIONS

Huawei., et al., "Summary of Informal email Discussion for 'Physical Layer Aspects of Random Access Transmission'", 3GPP TSG RAN WG1 Meeting #83, R1-157512_EMTC-11, 3rd Generation Partnership Project, Mobile Competence Centre, 650, Route Des Lu, vol. RAN WG1, No. Anaheim, USA, Nov. 15, 2015-Nov. 22, 2015, (Year: 2015).*

(Continued)

*Primary Examiner* — Faiyazkhan Ghafoerkhan
(74) *Attorney, Agent, or Firm* — Harrity & Harrity, LLP

(57) ABSTRACT

Various aspects of the present disclosure generally relate to wireless communication. In some aspects, a user equipment (UE) may receive first information indicating a first set of parameters associated with repetition of a second random access message (RAM) associated with a random access channel (RACH) procedure. The UE may transmit, using the first set of parameters, an initial RAM in association with the RACH procedure. Numerous other aspects are described.

30 Claims, 8 Drawing Sheets

(56) References Cited

OTHER PUBLICATIONS

Huawei., et al., "Summary of Informal email Discussion for 'Physical Layer Aspects of Random Access Transmission'", 3GPP TSG RAN WG1 Meeting #83, R1-157512_EMTC-11, 3rd Generation Partnership Project, Mobile Competence Centre, 650, Route Des Lu, vol. RAN WG1, No. Anaheim, USA, Nov. 15, 2015-Nov. 22, 2015, Nov. 17, 2015, XP051001065, 43 Pages, Chapter 2 on p. 2.
International Search Report and Written Opinion—PCT/US2022/073311—ISA/EPO—dated Oct. 12, 2022.

* cited by examiner

RANDOM ACCESS CHANNEL REPETITION

FIELD OF THE DISCLOSURE

Aspects of the present disclosure generally relate to wireless communication and to techniques and apparatuses for random access channel repetition.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving first information indicating a first set of parameters associated with repetition of a second random access message (RAM) associated with a random access channel (RACH) procedure. The method may include transmitting, using the first set of parameters, an initial RAM in association with the RACH procedure.

Some aspects described herein relate to a method of wireless communication performed by a base station. The method may include transmitting first information indicating a first set of parameters associated with repetition of a second RAM associated with a RACH procedure. The method may include receiving an initial RAM in association with the RACH procedure, the initial RAM indicating at least one of the first set of parameters.

Some aspects described herein relate to a UE for wireless communication. The user equipment may include a memory and one or more processors coupled to the memory. The one or more processors may be configured to receive first information indicating a first set of parameters associated with repetition of a second RAM associated with a RACH procedure. The one or more processors may be configured to transmit, using the first set of parameters, an initial RAM in association with the RACH procedure.

Some aspects described herein relate to a base station for wireless communication. The base station may include a memory and one or more processors coupled to the memory. The one or more processors may be configured to transmit first information indicating a first set of parameters associated with repetition of a second RAM associated with a RACH procedure. The one or more processors may be configured to receive an initial RAM in association with the RACH procedure, the initial RAM indicating at least one of the first set of parameters.

Some aspects described herein relate to a non-transitory computer-readable medium that stores a set of instructions for wireless communication by a UE. The set of instructions, when executed by one or more processors of the UE, may cause the UE to receive first information indicating a first set of parameters associated with repetition of a second RAM associated with a RACH procedure. The set of instructions, when executed by one or more processors of the UE, may cause the UE to transmit, using the first set of parameters, an initial RAM in association with the RACH procedure.

Some aspects described herein relate to a non-transitory computer-readable medium that stores a set of instructions for wireless communication by a base station. The set of instructions, when executed by one or more processors of the base station, may cause the base station to transmit first information indicating a first set of parameters associated with repetition of a second RAM associated with a RACH procedure. The set of instructions, when executed by one or more processors of the base station, may cause the base station to receive an initial RAM in association with the RACH procedure, the initial RAM indicating at least one of the first set of parameters.

Some aspects described herein relate to an apparatus for wireless communication. The apparatus may include means for receiving first information indicating a first set of parameters associated with repetition of a second RAM associated with a RACH procedure. The apparatus may include means for transmitting, using the first set of parameters, an initial RAM in association with the RACH procedure.

Some aspects described herein relate to an apparatus for wireless communication. The apparatus may include means for transmitting first information indicating a first set of parameters associated with repetition of a second RAM associated with a RACH procedure. The apparatus may include means for receiving an initial RAM in association with the RACH procedure, the initial RAM indicating at least one of the first set of parameters.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
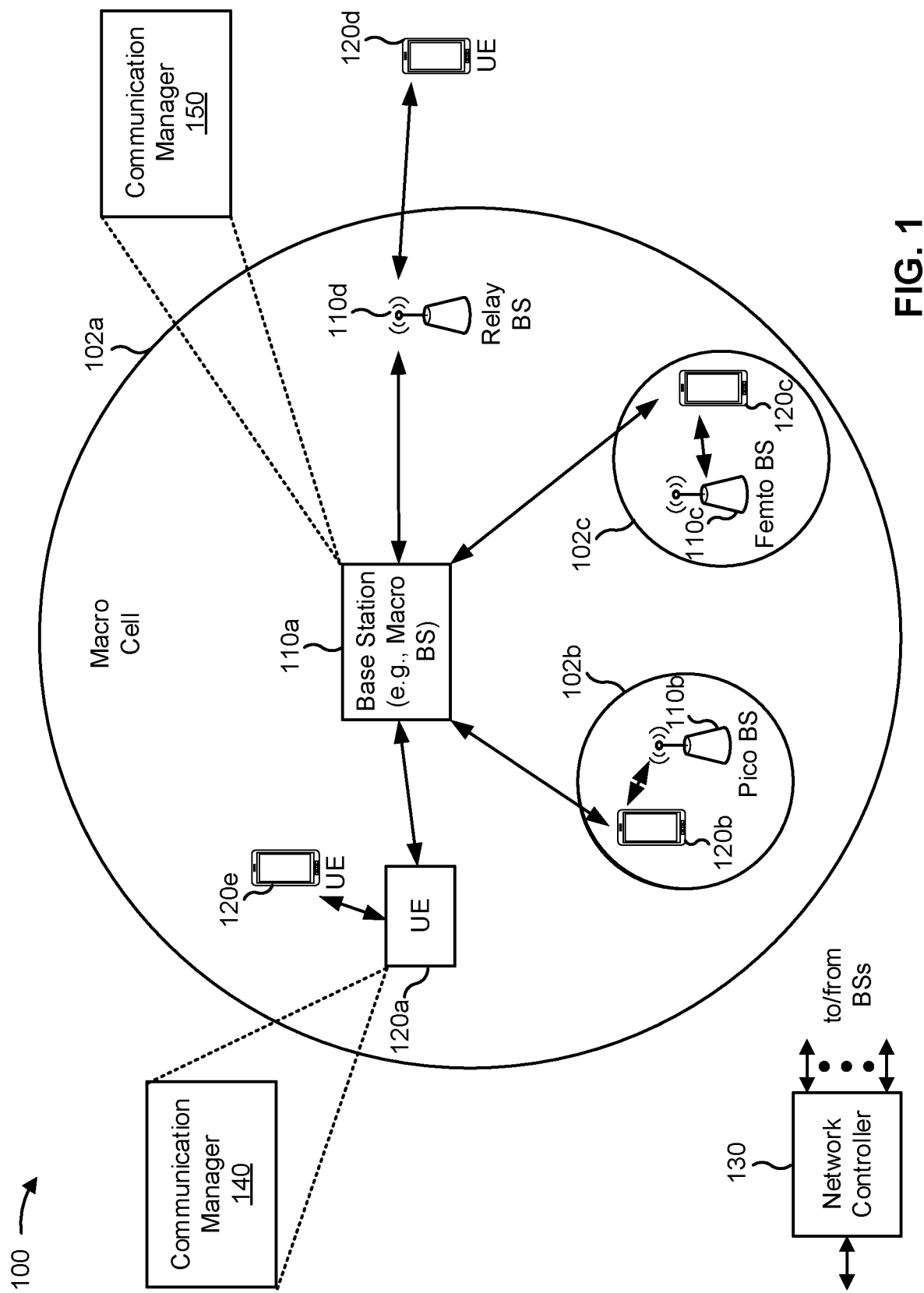
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile.

A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive first information indicating a first set of parameters associated with repetition of a second random access message (RAM) (e.g., a radio resource control (RRC) connection request) associated with a random access channel (RACH) procedure; and transmit, using the first set of parameters, an initial RAM in association with the RACH procedure. Additionally, or alternatively, the communication manager 140 may perform one or more other operations described herein.

In some aspects, the base station 110 may include a communication manager 150. As described in more detail elsewhere herein, the communication manager 150 may transmit first information indicating a first set of parameters associated with repetition of a second RAM (e.g., an RRC connection request) associated with a RACH procedure; and receive an initial RAM in association with the RACH procedure, the initial RAM indicating at least one of the first set of parameters. Additionally, or alternatively, the communication manager 150 may perform one or more other operations described herein.

As indicated above, FIG. 1 is provided as an example. Other examples may differ from what is described with regard to FIG. 1.

Figure 2:
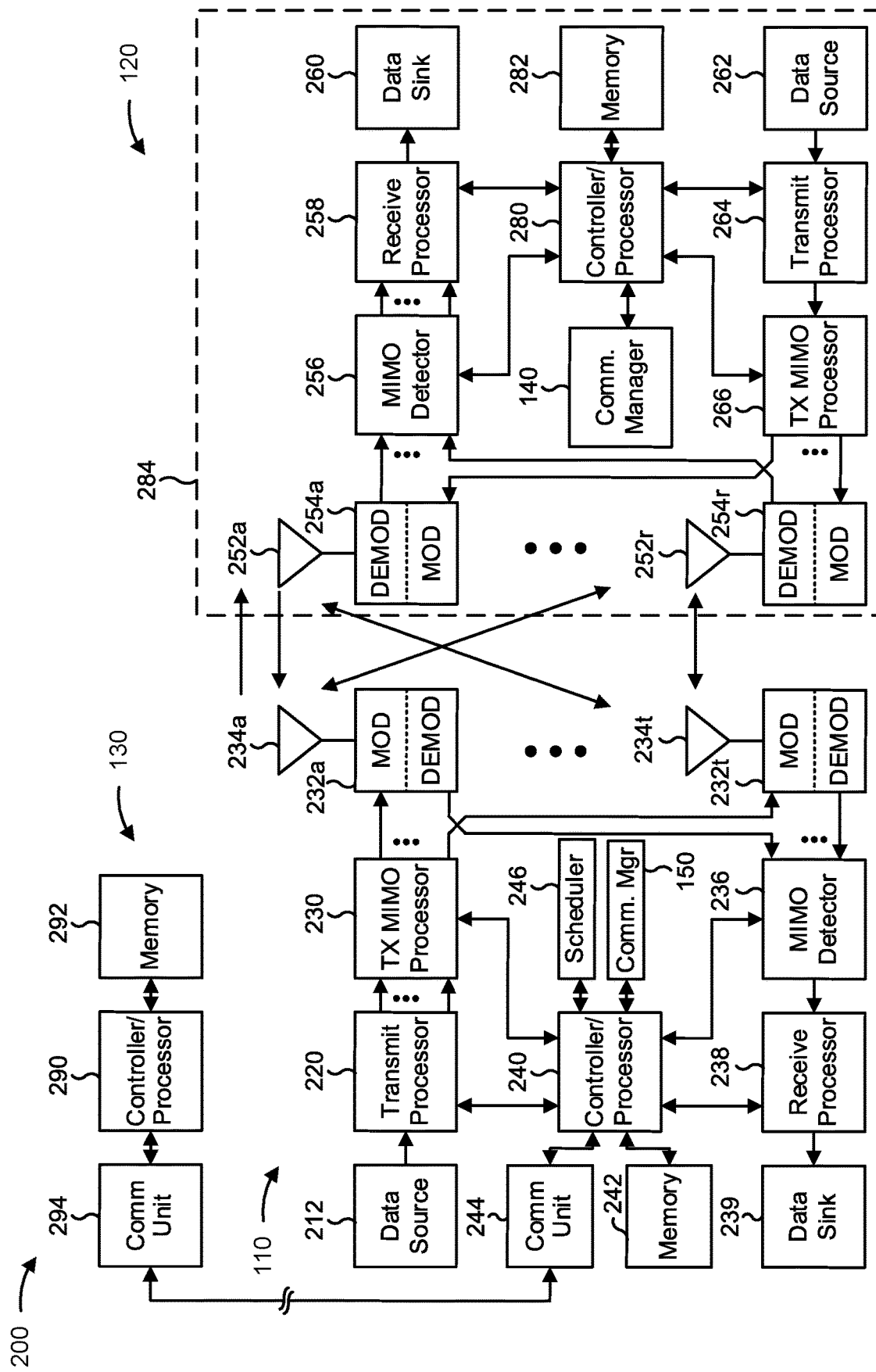
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-8).

The controller/processor 240 of the base station 110, controller/processor 280 of the UE 120, and/or any other component(s) of FIG. 2 may perform one or more techniques associated with random access channel repetition, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, the UE includes means for receiving first information indicating a first set of parameters associated with repetition of a second RAM (e.g., an RRC connection request) associated with a RACH procedure; and/or means for transmitting, using the first set of parameters, an initial RAM in association with the RACH procedure. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting first information indicating a first set of parameters associated with repetition of a second RAM (e.g., an RRC connection request) associated with a RACH procedure; and/or means for receiving an initial RAM in association with the RACH procedure, the initial RAM indicating at least one of the first set of parameters. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
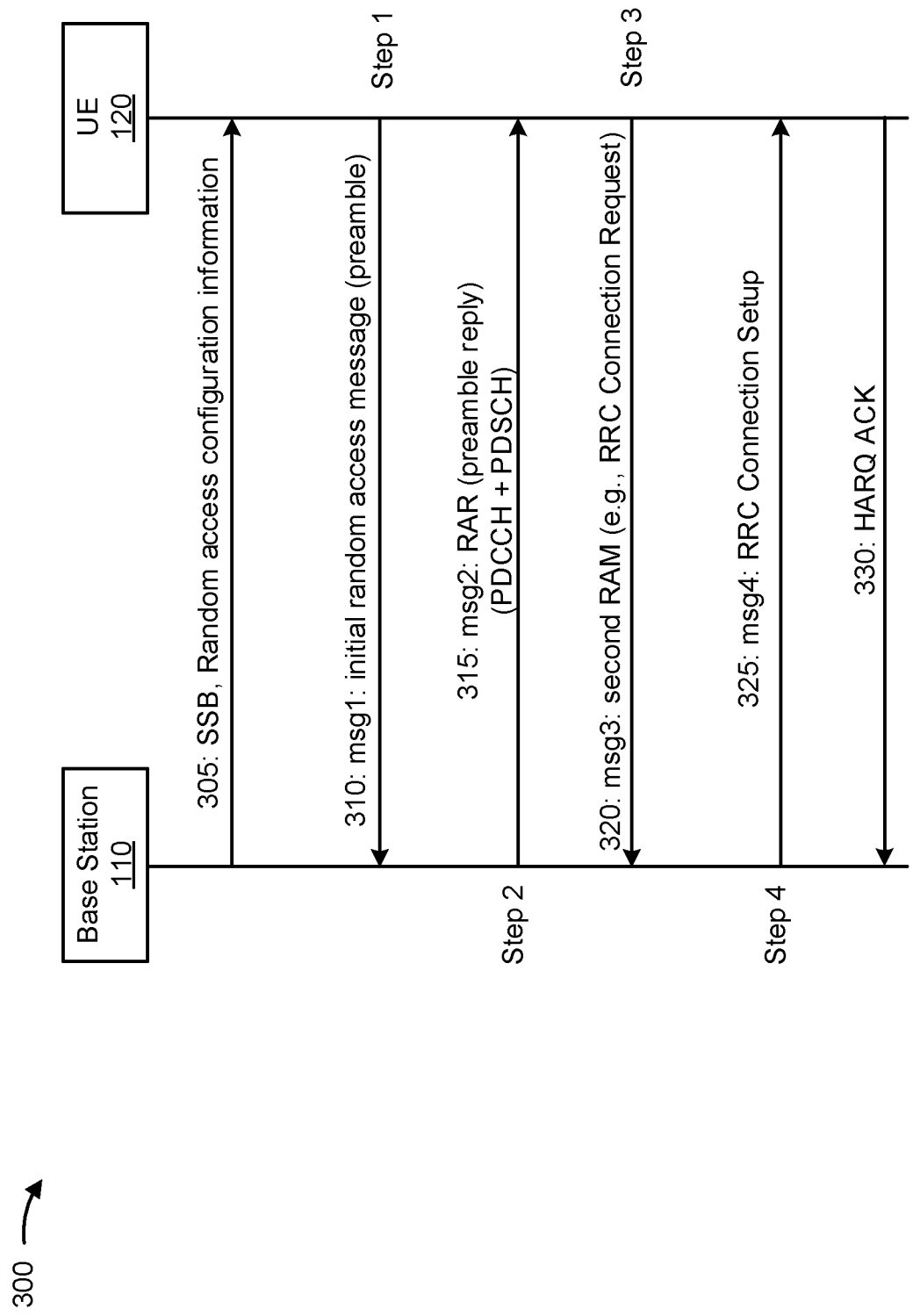
FIG. 3 is a diagram illustrating an example of a four-step random access procedure, in accordance with the present disclosure.

FIG. 3 is a diagram illustrating an example 300 of a four-step random access procedure, in accordance with the present disclosure. As shown in FIG. 3, a base station 110 and a UE 120 may communicate with one another to perform the four-step random access procedure.

As shown by reference number 305, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in an RRC message and/or a physical downlink control channel (PDCCH) order message that triggers a RACH procedure, such as for contention-free random access. The random access configuration information may include one or more parameters to be used in the random access procedure, such as one or more parameters for transmitting a RAM and/or one or more parameters for receiving a random access response (RAR).

As shown by reference number 310, the UE 120 may transmit an initial RAM, which may include a preamble (sometimes referred to as a random access preamble, a physical RACH (PRACH) preamble, or a RAM preamble). The message that includes the preamble may be referred to as a RAM, a message 1, msg1, MSG1, a first message, or an initial message in a four-step random access procedure. The random access message may include a random access preamble identifier.

As shown by reference number 315, the base station 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the base station 110 may transmit a PDCCH communication for the RAR. The PDCCH communication may schedule a physical downlink shared channel (PDSCH) communication that includes the RAR. For example, the PDCCH communication may indicate a resource allocation for the PDSCH communication. Also as part of the second step of the four-step random access procedure, the base station 110 may transmit the PDSCH communication for the RAR, as scheduled by the PDCCH communication. The RAR may be included in a medium access control (MAC) protocol data unit (PDU) of the PDSCH communication.

As shown by reference number 320, the UE 120 may transmit a second RAM. The second RAM may be referred to as an RRC connection request, message 3, msg3, MSG3, or a third message of a four-step random access procedure. In some aspects, the second RAM may include a UE identifier, uplink control information (UCI), and/or a physical uplink shared channel (PUSCH) communication (e.g., an RRC connection request).

As shown by reference number 325, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information.

As shown by reference number 330, if the UE 120 successfully receives the RRC connection setup message, the UE 120 may transmit a hybrid automatic repeat request (HARD) acknowledgment (ACK) via a physical uplink control channel (PUCCH) communication.

As indicated above, FIG. 3 is provided as an example. Other examples may differ from what is described with regard to FIG. 3.

A repetition, such as an uplink repetition or a downlink repetition, may be used to improve reliability, such as for ultra-reliable low latency communication (URLLC) or for UEs located in a geographic area with poor channel conditions (such as a cell edge). When repetitions are used, a transmitter repeats transmission of a communication multiple times. For example, a UE may transmit an initial uplink communication and may repeat transmission of (that is, may retransmit) that uplink communication one or more times. Each repetition may include different encoded bits in accordance with different redundancy versions. Therefore, a receiver can attempt to combine multiple repetitions to improve the likelihood of successfully decoding a payload of the multiple repetitions.

Some techniques and apparatuses described herein enable a UE and/or base station to support repetition for a second RAM (e.g., an RRC connection request or msg3) of a RACH procedure by using initial RAM (e.g., Msg1) parameters that support repetition. For example, a base station may transmit information indicating a set of parameters associated with repetition of the second RAM. A UE may receive the information and use the set of parameters to transmit an initial RAM (e.g., Msg1) requesting second RAM repetition for a RACH procedure. The base station may receive the initial RAM and, based on a RACH occasion (RO) and/or PRACH resources used to transmit the initial RAM, grant the request for second RAM repetition. Once the UE receives the grant (e.g., via Msg2), the UE may use repetition for the second RAM of the RACH procedure (e.g., the RRC connection request). By enabling the use of special RAM parameters to request repetition for a second RAM of the RACH procedure, the reliability of communications between the UE and base station may be improved (e.g., by improving the quality of the initial RAM and achieve a relatively low error rate comparable to the second RAM transmission). For example, the likelihood that the initial RAM will be received and decoded by the base station may be improved, bandwidth and/or signal quality may be improved, and the likelihood of dropped communications and/or degraded signal quality may be reduced.

Figure 4:
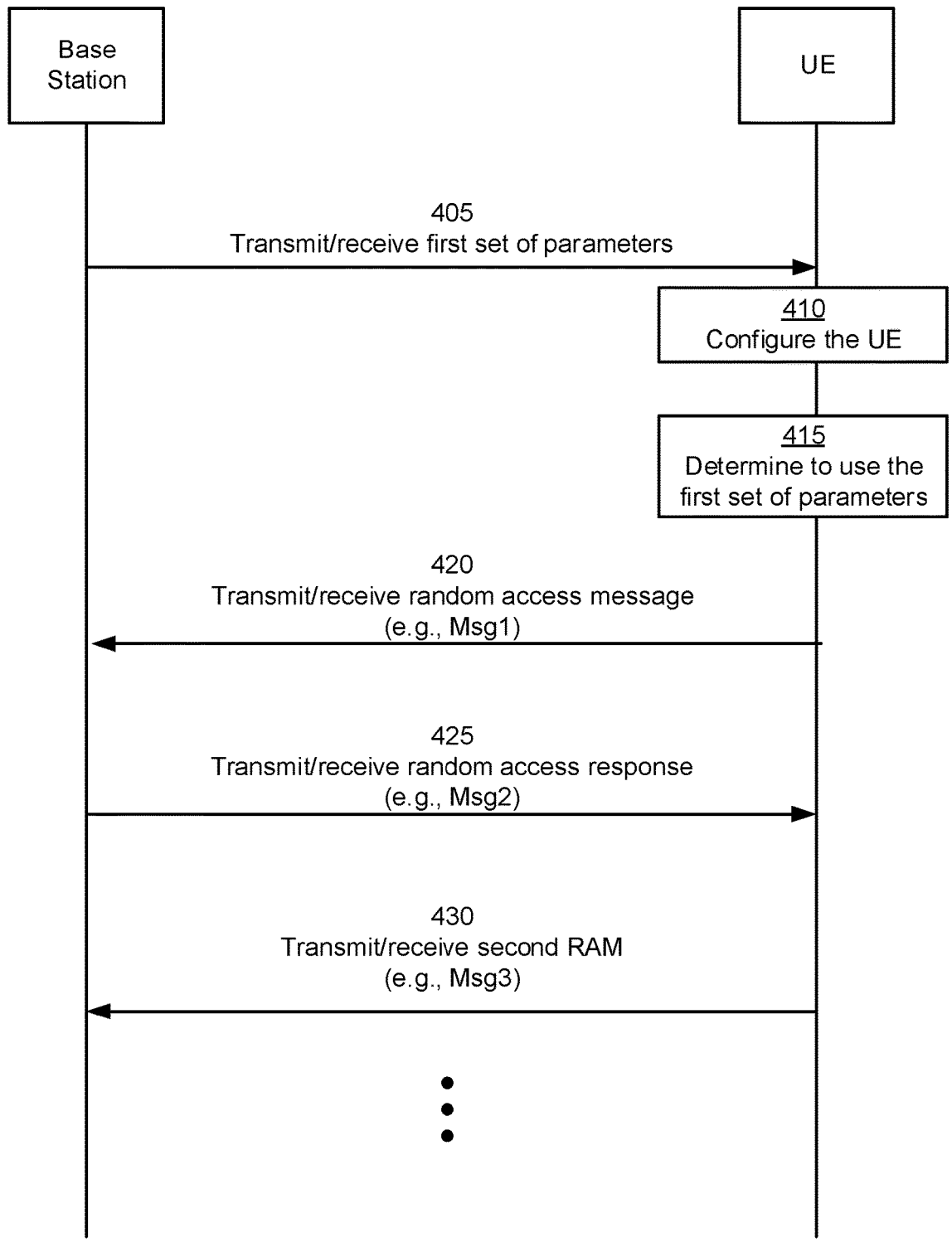
FIG. 4 is a diagram illustrating an example associated with random access channel repetition, in accordance with the present disclosure

FIG. 4 is a diagram illustrating an example 400 associated with random access channel repetition, in accordance with the present disclosure. As shown in FIG. 4, a UE (e.g., UE 120) may communicate (e.g., transmit an uplink transmission and/or receive a downlink transmission) with a base station (e.g., base station 110). The UE and the base station may be part of a wireless network (e.g., wireless network 100).

As shown by reference number 405, the base station may transmit, and the UE may receive, first information indicating a first set of parameters associated with repetition of a second RAM (e.g., an RRC connection request) associated with a RACH procedure. In some aspects, the UE may receive the information from another device (e.g., from another base station or another UE). In some aspects, the UE may receive the information via RRC signaling and/or MAC signaling (e.g., MAC control elements (MAC CEs)). In some aspects, the base station may transmit the information in system information (SI) in information elements (IE). In some aspects, the information may include an indication of the first set of parameters (e.g., already known to the UE) for selection by the UE and/or explicit information for the UE to use to configure the UE using the first set of parameters.

In some aspects, the first set of parameters may include RAM transmission parameters (e.g., for an initial RAM, or msg1, associated with the RACH procedure). RAM parameters may include, for example, an initial random access preamble power (e.g., "preambleReceivedTargetPower"), a power ramping factor (e.g., "powerRampingStep"), a high priority, or prioritized, power ramping factor (e.g., "powerRampingStepHighPriority"), a maximum number of preamble transmissions (e.g., "preambleTransMax"), and/or an indicator of an alternate configuration ("groupBconfigured"), among other examples.

In some aspects, the first set of parameters may include parameters related to a size of an uplink grant associated with the second RAM (e.g., "group B" parameters). For example, a threshold to determine groups of random access preambles (e.g., "ra-Msg3 SizeGroupA"), a power offset between Msg3 and RACH preamble transmission (e.g., "msg3-DeltaPreamble"), a power offset for preamble selection (e.g., "messagePowerOffsetGroupB"), and/or a number of random access preambles in random access preamble group A for each SSB (e.g., "numberOfRA-PreamblesGroupA"), among other examples.

In some aspects, the first set of parameters may include cell reselection parameters. Cell reselection parameters may include, for example, a minimum RSRP requirement for cell selection (e.g., "$Q_{rxlevmin}$"), and/or a minimum required quality level in a cell (e.g., "$Q_{qualmin}$"), among other examples.

In some aspects, the first set of parameters may include supplemental uplink (SUL) parameters. Supplemental uplink parameters may include, for example, a signal quality threshold for selection of supplemental uplink parameters (e.g., rsrp-ThresholdSSB-SUL"), and/or a threshold for coverage enhancement (e.g., repetition) for supplemental uplink parameters (e.g., "rsrp-ThresholdSSB-CovEnh-SUL"), among other examples.

The first set of parameters may include any single parameter or any combination of the foregoing parameters.

In some aspects, the base station may transmit, and the UE may receive, second information indicating a second set of parameters associated with transmitting the second RAM without requesting repetition. In this situation, the second set of parameters may be different from the first set of parameters. For example, the first set of parameters may be used when the UE requests repetition of the second RAM and, when the UE is not requesting repetition of the second RAM, the second set of parameters may be used (e.g., used to transmit an initial RAM, or msg1, as described herein). In some aspects, the UE may determine that the base station supports repetition of second RAMs (e.g., RRC connection requests) based at least in part on receiving the first set of parameters. For example, a base station that does not support repetition of second RAMs may not send the first set of parameters, and only send the second set of parameters. In this situation, the UE may use the presence of the first set of parameters as an indication that the base station supports second RAM repetition.

As shown by reference number 410, the UE may configure the UE for communicating with the base station. In some aspects, the UE may configure the UE based at least in part on the first set of parameters. In some aspects, the UE may be configured to perform one or more operations described herein.

As shown by reference number 415, the UE may determine to use the first set of parameters for transmission of an initial RAM (e.g., msg1). In some aspects, the UE may determine to use the first set of parameters based at least in part on receiving the information indicating the first set of parameters. For example, simply receiving the first set of parameters may indicate, to the UE, that repetition of the second RAM is supported and that the first set of parameters should be used to transmit the initial RAM.

In some aspects, the UE may determine to use the first set of parameters based at least in part on one or more signal measurements satisfying a threshold. For example, the UE may determine to request repetition of the second RAM based at least in part on an RSRP (or other signal quality measurement) of one or more SSBs satisfying an RSRP threshold (e.g., being below the RSRP threshold).

In some aspects, the UE may determine to use a subset of the first set of parameters for transmission of the initial RAM. For example, SUL parameters may be associated with a threshold, such that satisfying the threshold may cause the UE to use one or more different parameters of the first set of parameters. In a situation where the first set of parameters includes a threshold for coverage enhancement for SUL parameters (e.g., "rsrp-ThresholdSSB-CovEnh-SUL"), whether the UE determines to use the SUL parameters may depend on whether the correspond threshold is satisfied (e.g., an RSRP threshold for one or more SSB signals, which may be the same as or different from another RSRP threshold used to determine whether repetition of the second RAM is to be requested). In this situation, if the threshold for coverage enhancement is not met, the UE may use normal uplink (NUL) parameters for transmission of initial RAM (alone or in combination with other parameters of the first set of parameters).

As shown by reference number 420, the UE may transmit, and the base station may receive, an initial RAM in association with a RACH procedure, as described herein (e.g., msg1). In some aspects, the initial RAM may be transmitted using the first set of parameters or a subset of the first set of parameters, as described herein. By transmitting the initial RAM with the first set of parameters, the UE may provide enhanced coverage for the initial RAM, which may facilitate reception of the initial RAM and proceeding to the second RAM. In some aspects, the UE may indicate, to the base station, that the UE is requesting repetition of a second RAM (e.g., the RRC connection request, or msg3) based at least in part on a RACH occasion (RO) and/or PRACH resources used to transmit the initial RAM. For example, the base station may be associated with dedicated ROs and/or PRACH resources (e.g., identified in the first information, separate configuration information, and/or the like) specifically configured to be used by the UE for requesting repetition of the second RAM. The base station may determine, based at least in part on receiving the first set of parameters (as opposed to the second set of parameters associated with a normal RACH procedure without repetition of the second RAM), that the UE is requesting repetition of the second RAM.

As shown by reference number 425, the base station may transmit, and the UE may receive, an RAR associated with the RACH procedure, as described herein (e.g., Msg2). In some aspects, the RAR may be transmitted based at least in part on receiving the initial RAM, and the RAR may indicate that repetition of the second RAM is granted. In some aspects, as described herein, the base station may determine that the UE is requesting repetition of the second RAM based at least in part on a RACH occasion (RO) and/or PRACH resources used to transmit the initial RAM.

As shown by reference number 430, the UE may transmit, and the base station may receive, a second RAM (e.g., an RRC connection request, or msg3). The UE may transmit the second RAM based at least in part on receiving the RAR (e.g., msg2). In some aspects, the UE may be configured to use repetition on the second RAM, as described herein.

While not shown in FIG. 4, the RACH procedure may continue after transmission/receipt and repetition of the second RAM, as described herein. For example, the base station may transmit, and the UE may receive, a contention resolution message (e.g., Msg4) associated with the RACH procedure. Following receipt of the contention resolution message, the UE may transmit, and the base station may receive, an acknowledgment, as described herein.

As indicated above, FIG. 4 is provided as an example. Other examples may differ from what is described with regard to FIG. 4.

Figure 5:
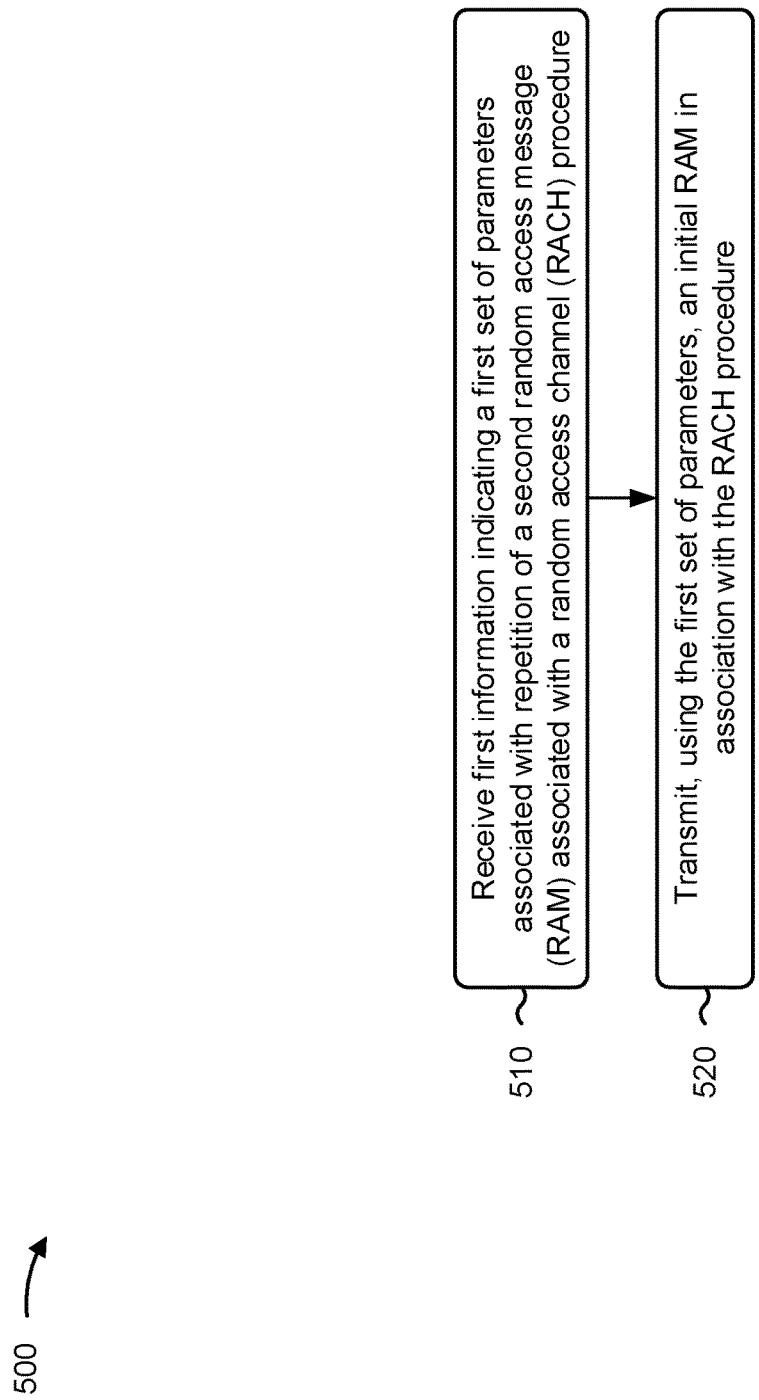
FIGS. 5 and 6 are diagrams illustrating example processes associated with random access channel repetition, in accordance with the present disclosure.

FIG. 5 is a diagram illustrating an example process 500 performed, for example, by a UE, in accordance with the present disclosure. Example process 500 is an example where the UE (e.g., UE120) performs operations associated with random access channel repetition.

As shown in FIG. 5, in some aspects, process 500 may include receiving first information indicating a first set of parameters associated with repetition of a second RAM associated with a RACH procedure (block 510). For example, the UE (e.g., using communication manager 140 and/or reception component 702, depicted in FIG. 7) may receive first information indicating a first set of parameters associated with repetition of a second RAM associated with a RACH procedure, as described above. In some aspects, the second RAM may include msg3 (e.g., an RRC connection request).

As further shown in FIG. 5, process 500 may include transmitting, using the first set of parameters, an initial RAM in association with the RACH procedure (block 520). For example, the UE (e.g., using communication manager 140 and/or transmission component 704, depicted in FIG. 7) may transmit, using the first set of parameters, an initial RAM in association with the RACH procedure, as described above.

Process 500 may include additional aspects, such as any single aspect or any combination of aspects described below and/or in connection with one or more other processes described elsewhere herein.

In a first aspect, process 500 includes receiving second information indicating a second set of parameters associated with transmitting the second RAM without requesting repetition, the second set of parameters being different from the first set of parameters, and determining to use the first set of parameters for transmission of the initial RAM.

In a second aspect, alone or in combination with the first aspect, determining to use the first set of parameters comprises determining to use the first set of parameters based at least in part on one or more signal measurements satisfying a threshold.

In a third aspect, alone or in combination with one or more of the first and second aspects, determining to use the first set of parameters comprises determining to use the first set of parameters based at least in part on receiving the first information indicating the first set of parameters.

In a fourth aspect, alone or in combination with one or more of the first through third aspects, the first set of parameters comprises RAM transmission parameters.

In a fifth aspect, alone or in combination with one or more of the first through fourth aspects, the first set of parameters comprises parameters related to a size of an uplink grant associated with the second RAM.

In a sixth aspect, alone or in combination with one or more of the first through fifth aspects, the first set of parameters comprises cell reselection parameters.

In a seventh aspect, alone or in combination with one or more of the first through sixth aspects, the first set of parameters comprises supplemental uplink parameters.

In an eighth aspect, alone or in combination with one or more of the first through seventh aspects, the second RAM comprises an RRC connection request.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
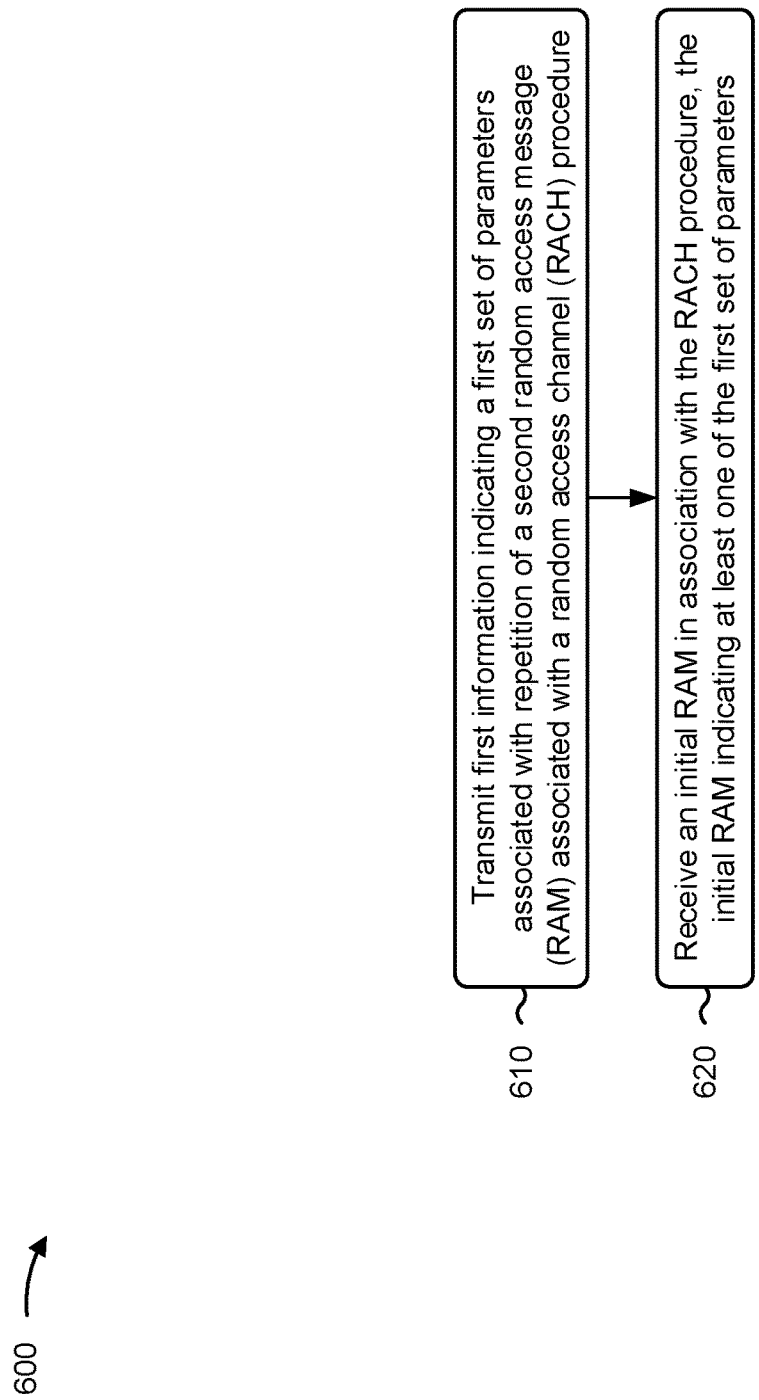

FIG. 6 is a diagram illustrating an example process 600 performed, for example, by a base station, in accordance with the present disclosure. Example process 600 is an example where the base station (e.g., base station 110) performs operations associated with random access channel repetition.

As shown in FIG. 6, in some aspects, process 600 may include transmitting first information indicating a first set of parameters associated with repetition of a second RAM associated with a RACH procedure (block 610). For example, the base station (e.g., using communication manager 150 and/or transmission component 804, depicted in FIG. 8) may transmit first information indicating a first set of parameters associated with repetition of a second RAM associated with a RACH procedure, as described above. In some aspects, the second RAM may include msg3 (e.g., an RRC connection request).

As further shown in FIG. 6, in some aspects, process 600 may include receiving an initial RAM in association with the RACH procedure, the initial RAM indicating at least one of the first set of parameters (block 620). For example, the base station (e.g., using communication manager 150 and/or reception component 802, depicted in FIG. 8) may receive an initial RAM in association with the RACH procedure, the initial RAM indicating at least one of the first set of parameters, as described above.

Process 600 may include additional aspects, such as any single aspect or any combination of aspects described below and/or in connection with one or more other processes described elsewhere herein.

In a first aspect, process 600 includes transmitting second information indicating a second set of parameters associated with transmitting the second RAM without requesting repetition, the second set of parameters being different from the first set of parameters.

In a second aspect, alone or in combination with the first aspect, process 600 includes transmitting, based at least in part on receiving the initial RAM, a RAR indicating that repetition of the second RAM is granted.

In a third aspect, alone or in combination with one or more of the first and second aspects, the first set of parameters comprises RAM transmission parameters.

In a fourth aspect, alone or in combination with one or more of the first through third aspects, the first set of parameters comprises parameters related to a size of an uplink grant associated with the second RAM.

In a fifth aspect, alone or in combination with one or more of the first through fourth aspects, the first set of parameters comprises cell reselection parameters.

In a sixth aspect, alone or in combination with one or more of the first through fifth aspects, the first set of parameters comprises supplemental uplink parameters.

In a seventh aspect, alone or in combination with one or more of the first through sixth aspects, the second RAM comprises an RRC connection request.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Some techniques and apparatuses described herein enable a UE and/or base station to support repetition for a second RAM (e.g., an RRC connection request or msg3) of a RACH procedure by using initial RAM (e.g., Msg1) parameters that support repetition. For example, a base station may transmit information indicating a set of parameters associated with repetition of the second RAM. A UE may receive the information and use the set of parameters to transmit an initial RAM (e.g., Msg1) requesting second RAM repetition for a RACH procedure. The base station may receive the initial RAM and, based on an RO and/or PRACH resources used to transmit the initial RAM, grant the request for second RAM repetition. Once the UE receives the grant (e.g., via Msg2), the UE may use repetition for the second RAM of the RACH procedure (e.g., the RRC connection request). By enabling the use of special RAM parameters to request repetition for a second RAM of the RACH procedure, the reliability of communications between the UE and base station may be improved (e.g., by improving the quality of the initial RAM and achieve a relatively low error rate comparable to the second RAM transmission). For example, the likelihood that the initial RAM will be received and decoded by the base station may be improved, bandwidth and/or signal quality may be improved, and the likelihood of dropped communications and/or degraded signal quality may be reduced.

Figure 7:
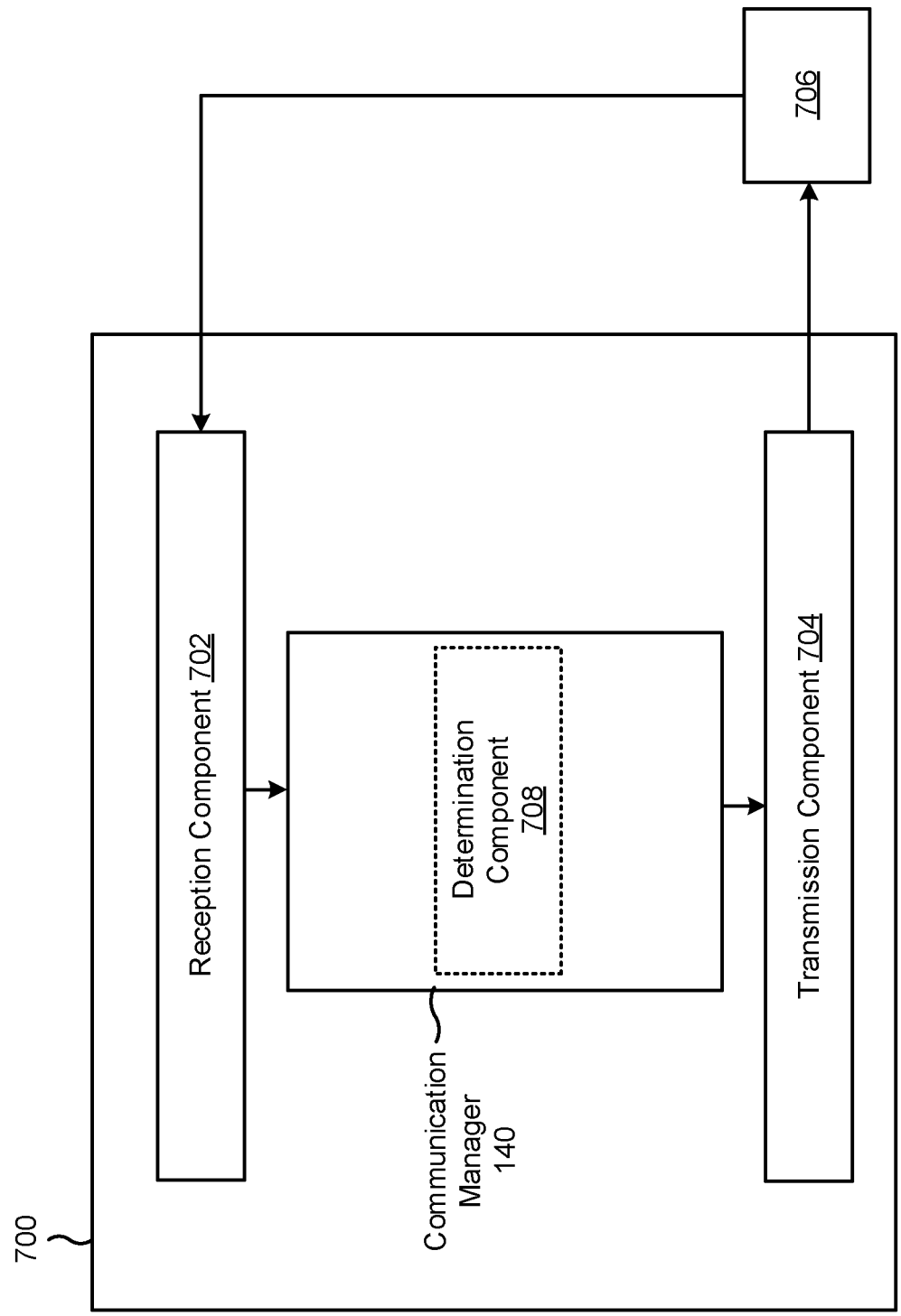
FIGS. 7 and 8 are diagrams of example apparatuses for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include a determination component 708, among other examples.

In some aspects, the apparatus 700 may be configured to perform one or more operations described herein in connection with FIGS. 4-6. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive first information indicating a first set of parameters associated with repetition of a second RAM associated with a RACH procedure. The transmission component 704 may transmit, using the first set of parameters, an initial RAM in association with the RACH procedure.

The reception component 702 may receive second information indicating a second set of parameters associated with transmitting the second RAM without requesting repetition the second set of parameters being different from the first set of parameters.

The determination component 708 may determine to use the first set of parameters for transmission of the initial RAM.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
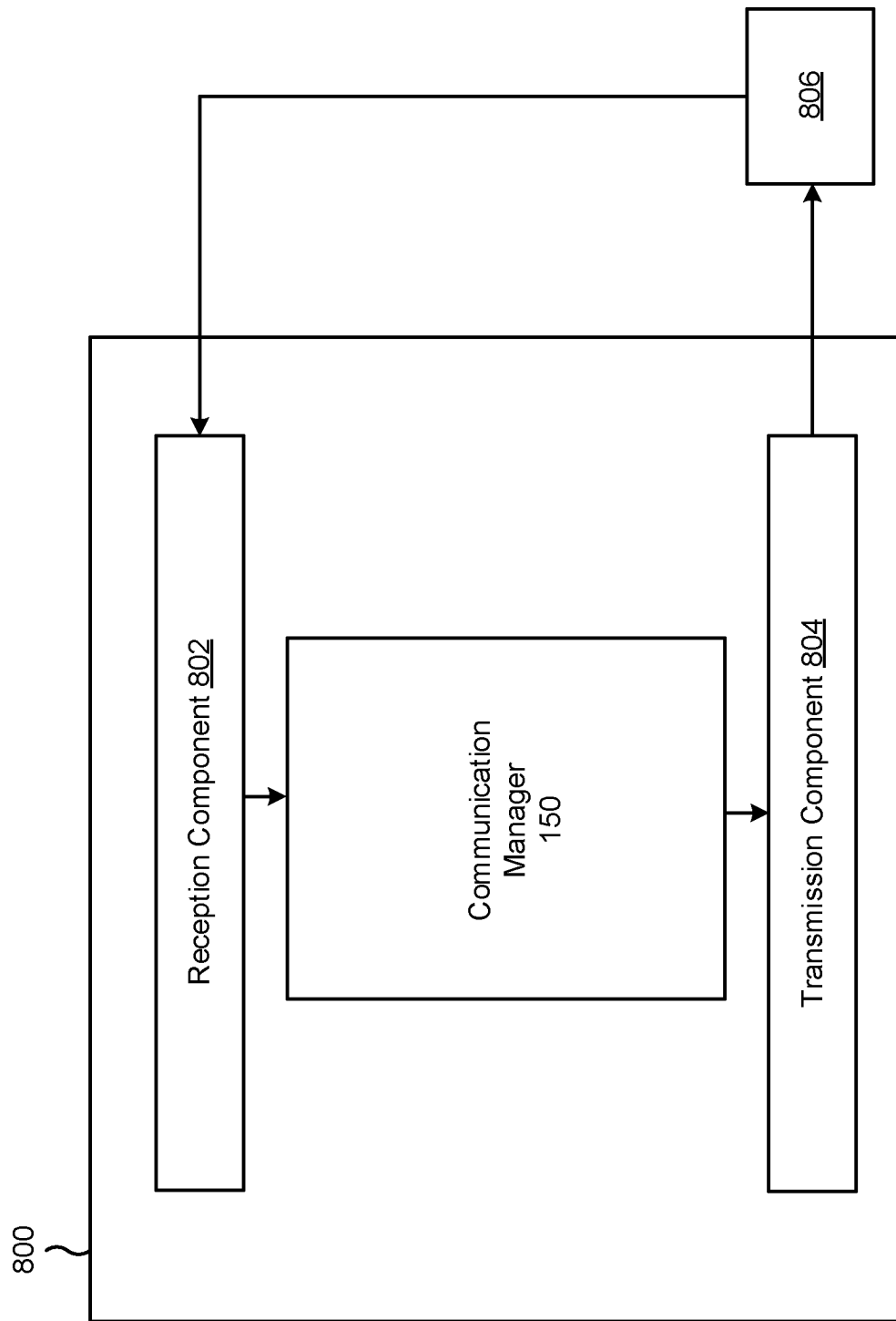

FIG. 8 is a diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150.

In some aspects, the apparatus 800 may be configured to perform one or more operations described herein in connection with FIGS. 4-6. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The transmission component 804 may transmit first information indicating a first set of parameters associated with repetition of a second RAM associated with a RACH procedure. The reception component 802 may receive an initial RAM in association with the RACH procedure, the initial RAM indicating at least one of the first set of parameters.

The transmission component 804 may transmit second information indicating a second set of parameters associated with transmitting the second RAM without requesting repetition the second set of parameters being different from the first set of parameters.

The transmission component 804 may transmit, based at least in part on receiving the initial RAM, an RAR indicating that repetition of the second RAM is granted.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a UE, comprising: receiving first information indicating a first set of parameters associated with repetition of a second RAM associated with a RACH procedure; and transmitting, using the first set of parameters, an initial RAM in association with the RACH procedure.

Aspect 2: The method of Aspect 1, further comprising: receiving second information indicating a second set of parameters associated with transmitting the second RAM without requesting repetition, the second set of parameters being different from the first set of parameters; and determining to use the first set of parameters for transmission of the initial RAM.

Aspect 3: The method of any of Aspects 1-2, wherein determining to use the first set of parameters comprises: determining to use the first set of parameters based at least in part on one or more signal measurements satisfying a threshold.

Aspect 4: The method of Aspect 2, wherein determining to use the first set of parameters comprises: determining to use the first set of parameters based at least in part on receiving the first information indicating the first set of parameters.

Aspect 5: The method of any of Aspects 1-4, wherein the first set of parameters comprises RAM transmission parameters.

Aspect 6: The method of any of Aspects 1-5, wherein the first set of parameters comprises parameters related to a size of an uplink grant associated with the second RAM.

Aspect 7: The method of any of Aspects 1-6, wherein the first set of parameters comprises cell reselection parameters.

Aspect 8: The method of any of Aspects 1-7, wherein the first set of parameters comprises supplemental uplink parameters.

Aspect 9: The method of any of Aspects 1-8, wherein the second RAM comprises an RRC connection request.

Aspect 10: A method of wireless communication performed by a base station, comprising: transmitting first information indicating a first set of parameters associated with repetition of a second RAM associated with a RACH procedure; and receiving an initial RAM in association with the RACH procedure, the initial RAM indicating at least one of the first set of parameters.

Aspect 11: The method of Aspect 10, further comprising: transmitting second information indicating a second set of parameters associated with transmitting the second RAM without requesting repetition, the second set of parameters being different from the first set of parameters.

Aspect 12: The method of any of Aspects 10-11, further comprising: transmitting, based at least in part on receiving the initial RAM, a RAR indicating that repetition of the second RAM is granted.

Aspect 13: The method of any of Aspects 10-12, wherein the first set of parameters comprises RAM transmission parameters.

Aspect 14: The method of any of Aspects 10-13, wherein the first set of parameters comprises parameters related to a size of an uplink grant associated with the second RAM.

Aspect 15: The method of any of Aspects 10-14, wherein the first set of parameters comprises cell reselection parameters.

Aspect 16: The method of any of Aspects 10-15, wherein the first set of parameters comprises supplemental uplink parameters.

Aspect 17: The method of any of Aspects 10-16, wherein the second RAM comprises an RRC connection request.

Aspect 18: An apparatus for wireless communication at a device, comprising a processor; memory coupled with the processor; and instructions stored in the memory and executable by the processor to cause the apparatus to perform the method of one or more of Aspects 1-9.

Aspect 19: An apparatus for wireless communication at a device, comprising a processor; memory coupled with the processor; and instructions stored in the memory and executable by the processor to cause the apparatus to perform the method of one or more of Aspects 10-17.

Aspect 20: A device for wireless communication, comprising a memory and one or more processors coupled to the memory, the one or more processors configured to perform the method of one or more of Aspects 1-9.

Aspect 21: A device for wireless communication, comprising a memory and one or more processors coupled to the memory, the one or more processors configured to perform the method of one or more of Aspects 10-17.

Aspect 22: An apparatus for wireless communication, comprising at least one means for performing the method of one or more of Aspects 1-9.

Aspect 23: An apparatus for wireless communication, comprising at least one means for performing the method of one or more of Aspects 10-17.

Aspect 24: A non-transitory computer-readable medium storing code for wireless communication, the code comprising instructions executable by a processor to perform the method of one or more of Aspects 1-9.

Aspect 25: A non-transitory computer-readable medium storing code for wireless communication, the code comprising instructions executable by a processor to perform the method of one or more of Aspects 10-17.

Aspect 26: A non-transitory computer-readable medium storing a set of instructions for wireless communication, the set of instructions comprising one or more instructions that, when executed by one or more processors of a device, cause the device to perform the method of one or more of Aspects 1-9.

Aspect 27: A non-transitory computer-readable medium storing a set of instructions for wireless communication, the set of instructions comprising one or more instructions that, when executed by one or more processors of a device, cause the device to perform the method of one or more of Aspects 10-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors coupled to the memory, wherein the UE is configured to:
      receive, via radio resource control (RRC) signaling, first information indicating a first set of parameters associated with repetition of a second random access message (RAM) associated with a random access channel (RACH) procedure, wherein the first set of parameters comprises a signal quality threshold for selection of supplemental uplink parameters; and
      transmit, using the first set of parameters, an initial RAM in association with the RACH procedure.

2. The UE of claim 1, wherein the UE is further configured to:
   receive second information indicating a second set of parameters associated with transmitting the second RAM without requesting repetition,
      the second set of parameters being different from the first set of parameters; and determine to use the first set of parameters for transmission of the initial RAM.

3. The UE of claim 2, wherein the UE, to determine to use the first set of parameters, is configured to:
   determine to use the first set of parameters based at least in part on one or more signal measurements satisfying the signal quality threshold.

4. The UE of claim 2, wherein the UE, to determine to use the first set of parameters, is configured to:
   determine to use the first set of parameters based at least in part on receiving the first information indicating the first set of parameters.

5. The UE of claim 1, wherein the first set of parameters comprises RAM transmission parameters.

6. The UE of claim 1, wherein the first set of parameters comprises parameters related to a size of an uplink grant associated with the second RAM.

7. The UE of claim 1, wherein the first set of parameters comprises cell reselection parameters.

8. The UE of claim 1, wherein the second RAM comprises an RRC connection request.

9. The UE of claim 1, wherein the signal quality threshold comprises a reference signal received power threshold.

10. The UE of claim 1, wherein the first set of parameters comprises:
    a threshold to determine groups of random access preambles,
    a power offset between transmission of the initial RAM and the second RAM,
    a power offset for preamble selection, or
    a number of ransom access preambles in a random access preamble group.

11. The UE of claim 1, wherein the first set of parameters include an indicator of an alternate configuration.

12. A method of wireless communication performed by a user equipment (UE), comprising:
   receiving, via radio resource control (RRC) signaling, first information indicating a first set of parameters associated with repetition of a second random access message (RAM) associated with a random access channel (RACH) procedure, wherein the first set of parameters comprises a signal quality threshold for selection of supplemental uplink parameters; and
   transmitting, using the first set of parameters, an initial RAM in association with the RACH procedure.

13. The method of claim 12, further comprising:
   receiving second information indicating a second set of parameters associated with transmitting the second RAM without requesting repetition,
      the second set of parameters being different from the first set of parameters; and determining to use the first set of parameters for transmission of the initial RAM.

14. The method of claim 13, wherein determining to use the first set of parameters comprises:
   determining to use the first set of parameters based at least in part on one or more signal measurements satisfying the signal quality threshold.

15. The method of claim 13, wherein determining to use the first set of parameters comprises:
   determining to use the first set of parameters based at least in part on receiving the first information indicating the first set of parameters.

16. The method of claim 12, wherein the first set of parameters comprises RAM transmission parameters.

17. The method of claim 12, wherein the first set of parameters comprises parameters related to a size of an uplink grant associated with the second RAM.

18. The method of claim 12, wherein the first set of parameters comprises cell reselection parameters.

19. The method of claim 12, wherein the second RAM comprises an RRC connection request.

20. A network entity for wireless communication, comprising:
   a memory; and
   one or more processors coupled to the memory, wherein the network entity is configured to:
      transmit, via radio resource control (RRC) signaling, first information indicating a first set of parameters associated with repetition of a second random access message (RAM) associated with a random access channel (RACH) procedure, wherein the first set of parameters comprises a signal quality threshold for selection of supplemental uplink parameters; and
      receive an initial RAM in association with the RACH procedure, the initial RAM indicating at least one of the first set of parameters.

21. The network entity of claim 20, wherein the network entity is further configured to:
   transmit second information indicating a second set of parameters associated with transmitting the second RAM without requesting repetition,
      the second set of parameters being different from the first set of parameters.

22. The network entity of claim 20, wherein the network entity is further configured to:
   transmit, based at least in part on receiving the initial RAM, a random access response (RAR) indicating that repetition of the second RAM is granted.

23. The network entity of claim 20, wherein the first set of parameters comprises RAM transmission parameters.

24. The network entity of claim 20, wherein the first set of parameters comprises parameters related to a size of an uplink grant associated with the second RAM.

25. The network entity of claim 20, wherein the first set of parameters comprises cell reselection parameters.

26. The network entity of claim 20, wherein the second RAM comprises an RRC connection request.

27. A method of wireless communication performed by a network entity, comprising:
   transmitting, via radio resource control (RRC) signaling, first information indicating a first set of parameters associated with repetition of a second random access message (RAM) associated with a random access channel (RACH) procedure, wherein the first set of parameters comprises a signal quality threshold for selection of supplemental uplink parameters; and
   receiving an initial RAM in association with the RACH procedure, the initial RAM indicating at least one of the first set of parameters.

28. The method of claim 27, further comprising:
   transmitting second information indicating a second set of parameters associated with transmitting the second RAM without requesting repetition,
      the second set of parameters being different from the first set of parameters.

29. The method of claim 27, further comprising:
   transmitting, based at least in part on receiving the initial RAM, a random access response (RAR) indicating that repetition of the second RAM is granted.

30. The method of claim 27, wherein the first set of parameters comprises at least one of:
   RAM transmission parameters,
   parameters related to a size of an uplink grant associated with the second RAM,
   cell reselection parameters, or
   supplemental uplink parameters.

* * * * *